United States Patent
Hu et al.

(10) Patent No.: US 10,681,792 B2
(45) Date of Patent: Jun. 9, 2020

(54) SYSTEMS AND METHODS FOR AUTOMATIC LIGHTING FIXTURE LOCATION MAPPING

(71) Applicant: SIGNIFY HOLDING B.V., Eindhoven (NL)

(72) Inventors: Jia Hu, Brookline, MA (US); Maulin Dahyabhai Patel, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/759,397

(22) PCT Filed: Aug. 24, 2016

(86) PCT No.: PCT/EP2016/069976
§ 371 (c)(1),
(2) Date: Mar. 12, 2018

(87) PCT Pub. No.: WO2017/045885
PCT Pub. Date: Mar. 23, 2017

(65) Prior Publication Data
US 2018/0270933 A1    Sep. 20, 2018

Related U.S. Application Data

(60) Provisional application No. 62/220,515, filed on Sep. 18, 2015.

(51) Int. Cl.
*H05B 47/19* (2020.01)
*H04W 64/00* (2009.01)
(Continued)

(52) U.S. Cl.
CPC ......... *H05B 47/19* (2020.01); *H04L 41/0893* (2013.01); *H04L 41/12* (2013.01);
(Continued)

(58) Field of Classification Search
CPC . H05B 37/0272; H05B 37/0254; H04L 41/12; H04L 41/22; H04W 64/003
(Continued)

(56) References Cited

U.S. PATENT DOCUMENTS

2008/0218334 A1* 9/2008 Pitchers .............. H04L 41/0893
340/539.1
2008/0225521 A1    9/2008 Waffenschmidt et al.
(Continued)

FOREIGN PATENT DOCUMENTS

| WO | 2006095316 A1 | 9/2006 |
|---|---|---|
| WO | 2012168859 A2 | 12/2012 |
| WO | 2013057626 A2 | 4/2013 |

*Primary Examiner* — Omar Casillashernandez
(74) *Attorney, Agent, or Firm* — Daniel J. Piotrowski

(57) ABSTRACT

Lighting systems and methods for lighting fixture location mapping, for example, using a combination of photo sensing and/or other type of signaling, such as radiofrequency (RF) signaling is provided. The lighting systems may map a plurality of lighting fixtures to a plurality of spatial locations in a floor plan using the signal generating capabilities and sensors that are located within each of the lighting fixtures. The commissioning of the lighting fixtures may be automatically determined using a control system without significant manual intervention. In particular, the lighting fixtures may be mapped to their respective spatial locations by applying a heuristic analysis of strength of signals emitted and received between light fixtures and distances as provided in a building plan between spatial locations to which the light fixtures may be correlated.

17 Claims, 8 Drawing Sheets

(51) Int. Cl.
  *H05B 47/18*   (2020.01)
  *H05B 47/155*  (2020.01)
  *H04L 12/24*   (2006.01)

(52) U.S. Cl.
  CPC ........... *H04L 41/22* (2013.01); *H04W 64/003* (2013.01); *H05B 47/155* (2020.01); *H05B 47/18* (2020.01)

(58) Field of Classification Search
  USPC ...................................... 340/539.1
  See application file for complete search history.

(56) References Cited

U.S. PATENT DOCUMENTS

| | | | |
|---|---|---|---|
| 2009/0195349 A1 | 8/2009 | Frader-Thompson | |
| 2010/0035546 A1 | 2/2010 | Simons et al. | |
| 2011/0031897 A1 | 2/2011 | Henig et al. | |
| 2013/0221203 A1* | 8/2013 | Barrilleaux | G01J 1/0403 250/208.2 |
| 2014/0088772 A1* | 3/2014 | Lelkens | H04L 12/2816 700/286 |
| 2014/0175990 A1 | 6/2014 | Bhatkar et al. | |
| 2014/0204794 A1* | 7/2014 | El-Najjar | H04W 16/18 370/254 |
| 2014/0328211 A1* | 11/2014 | Holleis | H04L 41/145 370/254 |
| 2014/0354161 A1 | 12/2014 | Q | |
| 2018/0270933 A1* | 9/2018 | Hu | H04W 64/003 |

\* cited by examiner

SYSTEMS AND METHODS FOR AUTOMATIC LIGHTING FIXTURE LOCATION MAPPING

CROSS-REFERENCE TO PRIOR APPLICATIONS

This application is the U.S. National Phase application under 35 U.S.C. § 371 of International Application No. PCT/EP2016/069976, filed on Aug. 24, 2016 which claims the benefit of U.S. Provisional Patent Application No. 62/220,515 filed on Sep. 18, 2015. These applications are hereby incorporated by reference herein.

FIELD OF INVENTION

The present invention relates generally to lighting systems. More specifically, systems and methods for automatic lighting fixture location mapping, for example, using a combination of photosensor readings and/or other sensors for detecting signals other than visible light.

BACKGROUND

A lighting system may include multiple devices such as lamps, sensors and switches. Each of these devices may be independently obtained and connected to a control system via wired or wireless connections. The controls system can provide preprogrammed timers, sensors, and/or control that can help reduce operational costs by ensuring that the correct level of lighting is provided at the appropriate times. Each of the individual and discrete components of a lighting system are typically installed in accordance with a detailed floor plan, which may be provided in the form of construction drawings, e.g., AutoCAD drawings. The lighting systems may be used in both commercial and domestic settings, but are typically installed in large commercial buildings. The floor plans typically specify each device type, its position, and its connection (wired or wireless) to the control system.

In order for the control system to correctly control each of the components of the lighting system, a unique identifier for each lighting fixture (e.g., a bar code, a MAC address, etc.) of the lighting fixture needs to be correlated to the spatial location of the lighting fixture within the floor plan. This process is typically performed after all of the lighting fixtures are installed at their desired locations and performed by a skilled lighting commissioning engineer. The mapping of the each lighting fixture, along with its unique identifier, to the proper spatial location within a floor plan can be performed manually. It typically requires a lighting engineer to manually inspect each individual lighting fixture and manually recorded on a printout of a floor plan or inputted to an electronic version of the floor plan via a graphical interface. The manually entered data may be inputted or transferred to a fixture database that can associate each recorded identifier with a spatial location shown in the floor plan. Alternatively, a test signal may be used to cycle the power level of each light in turn. An installer or a similar specialist then walks around until the activated light is identified and matched to a spatial location within the floor plan. This process is repeated sequentially for each lighting fixture until all fixtures are correlated to a spatial location within the floor plan. After the lighting fixtures have been commissioned, the control system may provide any number of suitable instructions or configuration parameters to the lighting fixtures to control the operation of the lighting fixtures. For example, the instructions and/or configuration parameters may be provided in the form of a software program that can be uploaded to a memory located within each of the lighting fixtures for further execution.

There are many disadvantages of manually mapping lighting fixtures to spatial locations. For example, the manual commissioning process is time-consuming and can interfere with the ability of other contractors on a building site to proceed with their work. To further complicate the process, building contractors often do not follow the precise lighting layout specified in the floor plan. Therefore, in order to commission the lighting after the lights have been installed, a highly skilled commissioning engineering is needed to conduct manual commissioning, which can be costly. For a large lighting installation, the commission often involves tens or hundreds of lighting fixtures that need to be correlated to their correct spatial locations so that they can be operated appropriately together. Manual commissioning is not only time consuming and costly, but also prone to errors, such as, for example, data input mistakes. Such commissioning errors may lead to a control system sending commands to the wrong fixture, or commands that appear to have no effect. During the commissioning of a large installation, the errors may be further amplified.

The U.S. Pat. No. 8,159,156 ("the '156 patent") describes a lighting system for areal illumination having a remote driver and plurality of fixtures including luminaries, control devices, and/or standalone sensors. The '156 patent describes a method of commissioning a lighting system that measures a signal emitted from a signal source to determine relative distances between two fixtures. The relative distance measurements do not correspond to the actual distance between two fixtures but are either linearly related to or non-linearly related to the actual distance. To identify the spatial location of the fixtures, the '156 patent relies on a triangulation method, which maps each fixture individually and requires at least three references nodes. These at least three reference nodes must be manually established and is therefore, time consuming, tedious and prone errors from manual input. Although the '156 patent provides a triangulation method for auto-commissioning lighting, this method remains tedious, time consuming, and prone to errors.

Therefore, there is a continuing need in the art for an improved lighting system and method for commissioning lighting. It is an object of the present invention to provide an improved system and method for mapping a plurality of lighting fixtures to a plurality of spatial locations.

SUMMARY OF THE INVENTION

In accordance with the foregoing objectives and others, one embodiment of the present invention provides a method for mapping a plurality of lighting fixtures to a plurality of spatial locations. Each lighting fixture has a sensor. The method comprises the step of obtaining a first dataset corresponding to strengths of signals received by the sensor of each of the plurality of lighting fixtures from every other one of the plurality of lighting fixtures, and a second dataset corresponding to distances between each of the plurality of spatial locations to every other one of the plurality of spatial locations. In some embodiments, the first dataset is generated by sequentially directing each of the plurality of lighting fixtures to emit a measuring signal and receiving data corresponding to a strength of the measuring signal measured by the sensor from every other one of the plurality of lighting fixtures. The method also comprises the step of applying a heuristic evaluation using the first and second datasets to identify one or more possible mappings of the plurality of lighting fixtures to the plurality of spatial locations. In some embodiments, when the heuristic evaluation identifies more than one possible mappings, the method further comprises the steps of activating one of the plurality of lighting fixtures, receiving manual input data for a corresponding spatial location to the activated lighting fixture, and identifying a single mapping of the plurality of lighting fixtures to the plurality of spatial locations from the possible mappings based on the manual input data.

In one aspect, a lighting system is provided. The lighting system comprises a plurality of lighting fixtures. Each lighting fixture comprising a luminaire or a radio frequency (RF) signal generator, and a sensor, wherein the sensor is a photosensor or a RF signal sensor. The lighting system also comprises a control system configured to independently activate and deactivate each one of the luminaire or the RF signal generator and to receive data from each sensor corresponding to an amount of light detected or a strength of RF signal detected by each of the plurality of sensors. The control system is further configure to obtain a first dataset corresponding to strengths of signals received by the sensors of each of the plurality of lighting fixtures from every other one of the plurality of lighting fixtures, and a second dataset corresponding to distances between each of the plurality of spatial locations to every other one of the plurality of spatial locations, and apply a heuristic evaluation using the first and second datasets to identify one or more possible mappings of the plurality of lighting fixtures to the plurality of spatial locations.

In another aspect a non-transitory computer readable medium containing a set of instructions executable by a processor is provided. The set of instructions comprising obtaining a first dataset corresponding to strengths of signals received by the sensor of each of the plurality of lighting fixtures from every other one of the plurality of lighting fixtures, and a second dataset corresponding to distances between each of the plurality of spatial locations to every other one of the plurality of spatial locations. The set of instructions further comprises applying a heuristic evaluation using the first and second datasets to identify one or more possible mappings of the plurality of lighting fixtures to the plurality of spatial locations.

These and other aspects of the invention will become apparent to those skilled in the art after a reading of the following detailed description of the invention, including the figures and appended claims.

BRIEF DESCRIPTION OF THE FIGURES

FIG. 5b shows an initial graph according to the present invention for the light fixtures installed within the floor plan of FIG. 5a.

FIG. 5c shows a mapping according to the present invention for the light fixtures installed within the floor plan of FIG. 5a.

FIG. 6b shows an initial graph according to the present invention for the light fixtures installed within the floor plan of FIG. 6a.

FIG. 6c shows a mapping according to the present invention for the light fixtures installed within the floor plan of FIG. 6a.

DETAILED DESCRIPTION

Figure 1:
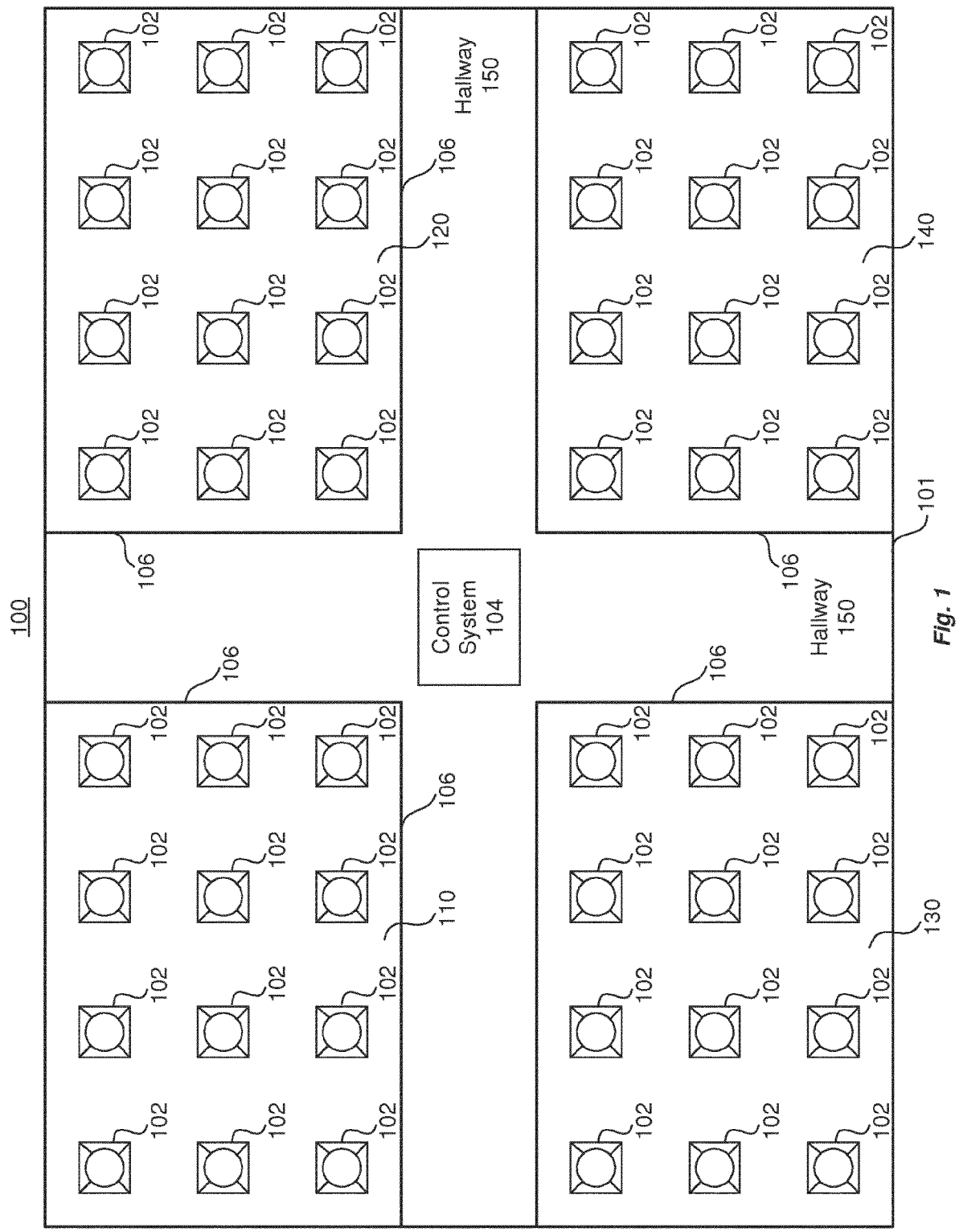
FIG. 1 shows an exemplary embodiment of a lighting system having a plurality of lighting fixtures installed within a floor plan according to the present invention.

The exemplary embodiments provide lighting systems and methods for mapping a plurality of lighting fixtures to a plurality of spatial locations in a floor plan by providing an efficient auto-commissioning method. Notably, the methods for mapping a plurality of lighting fixtures to a plurality of spatial locations in a floor plan as described below typically do not require the use of specialized beaconing devices or manual configuration of a number of beacon nodes to facilitate commissioning of the lighting fixtures. Rather, the light systems and methods described herein rely on the signal generating capabilities and sensors that are located within each of the lighting fixtures. The auto-commissioning lighting systems and methods describe herein provide a control system that can correlate a majority of lighting fixtures within a floor plan or within a lighting circuit to their spatial locations, without significant manual intervention. The exemplary embodiments may be further understood with reference to the following description of exemplary embodiments and the related appended drawings, wherein like elements are provided with the same reference numerals.

FIG. 1 shows an exemplary lighting system 100 having a plurality of lighting fixtures 102 installed within a floor plan 101. The lighting fixtures 102 may be connected to a control system 104 via a logical network, having wired or wireless connections to a control system 104. Such logical networks may include, for example, a local area network (LAN), a wide area network (WAN), an internal office-wide or building-wide computer network, a corporate intranet, or the Internet. For example, the lighting fixtures 102 may be physically connected by wires to the control system 104 during installation. The lighting fixtures 102 may communication with the control 104 system via any suitable wired communication link, e.g., Ethernet, serial port, Universal Serial Bus, etc. Alternatively, the lighting fixtures 102 may communication with the control system 104 using any suitable wireless communications means, such as, for example, e.g., Bluetooth, ZigBee, IEEE 802.1x, radio frequency, etc. The control system 104 may be configured to provide any number of suitable instructions or configuration parameters to the lighting fixtures to control the operation of the lighting fixtures. For example, the control system 104 may include a processor and a memory. The memory may include a set of instructions for execution by the processor. For example, the set of instructions may include methods for controlling the lighting fixtures 102, including whether it is powered on or off, and/or the intensity of light emitted from the lighting fixtures 102. The set of instructions may also include methods for commissioning lighting, such as mapping a plurality of lighting fixtures to a plurality of spatial locations in a floor plan.

It is noted that the lighting fixtures 102 may include any suitable signal-generating device for emitting a light or any other type of signal, and need not be identical to each other within a lighting system 100. Rather, the lighting fixtures 102 may each be independently selected from any number of suitable lighting devices, such as, for example, a light emitting device, an RF signal emitting device, a sensor, or a controller. In a typical lighting system 100, the majority of lighting fixtures 102 within the lighting system 100 are light emitting devices. As shown in the exemplary embodiment of FIG. 2, the lighting fixture 102 may include a luminaire 10. The luminaire 10 emits a light within the visible spectrum. The lighting fixtures 102 may also be a device that does not emit any light, for example, a sensor device or a controller. However, the lighting fixture 102 may include a signal-generating device for emitting a signal other than visible light, for example, a RF signal generator 14, or any other type of signal-generating device capable of emitting a signal other than visible light that is suitable for measuring the distances between two lighting fixtures 102.

In some embodiments, the lighting fixture 102 may further include a sensor. The sensor may be any suitable sensor for detecting a signal emitted from another lighting fixture 102. For example, the sensor may be a photosensor 12, a radio frequency (RF) signal sensor 16, and/or any other sensor capable of detecting a signal that is suitable for measuring the relative distances between two lighting fixtures 102. Typically, the sensor includes a photosensor 12. The photosensor 12 is capable of detecting light emitted from other lighting fixtures 102 of the lighting system 100. In particular, the photosensor 12 is capable of detecting an intensity of light received therein.

Figure 2:
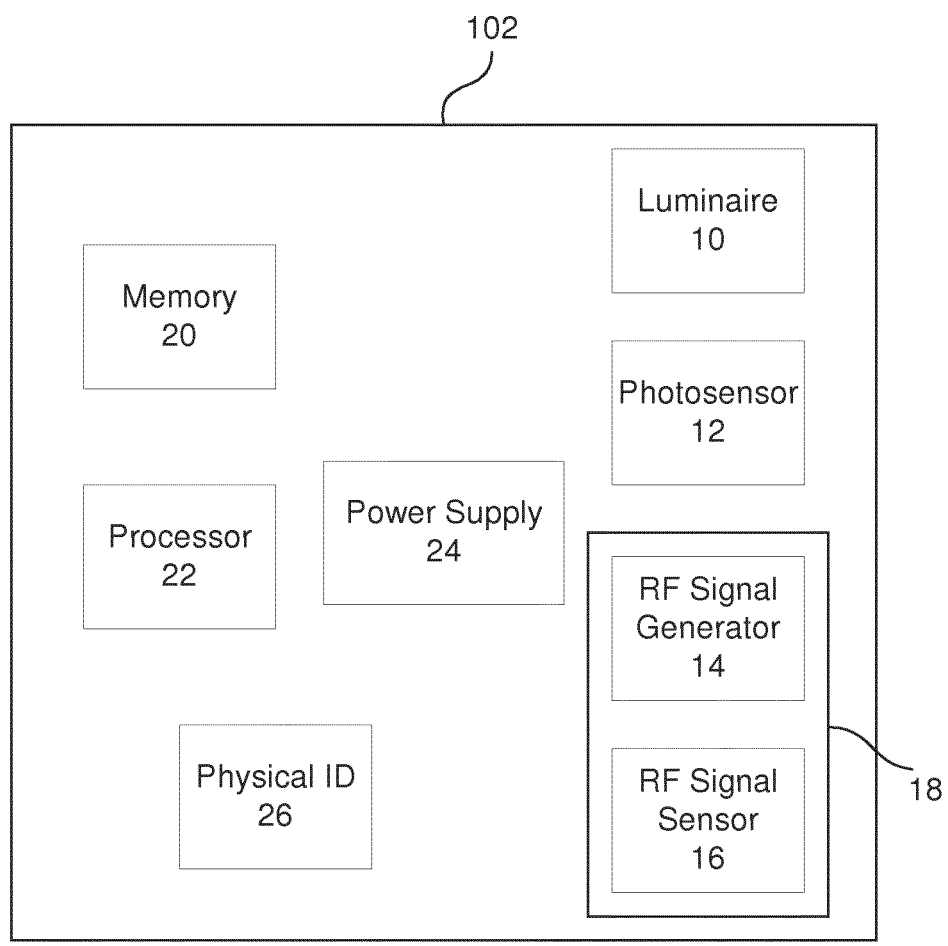
FIG. 2 shows an exemplary embodiment of a lighting fixture according to the present invention.

In certain embodiments, the lighting fixture 102 may include, as an alternative or in addition to the luminaire 10, a signal-generating device for emitting a signal other than visible light. For example, the signal-generating device may be a RF signal generator 14, or any other type of signal-generating device capable of emitting a signal other than visible light that is suitable for measuring the distances between two lighting fixtures 102. As another example, the lighting fixture 102 may include a RF signal sensor 16 for detecting a RF signal. In particular, the RF signal sensor 16 is capable of detecting an intensity or strength of a RF signal received thereby. As a further example. FIG. 2 shows that the lighting fixtures 102 may include a RF signal generator 14 with a RF signal sensor 16. Furthermore, the RF signal generator 14 and RF signal sensor 16 may be integrated within a single RF chip 18 configured to both emit and detect RF signals.

The lighting fixtures 102 may further comprise a memory 20, a processor 22, and/or a power source 24. The memory 20 may include information relating to the identity of the lighting fixtures 102, an electronic unique identifier for the lighting fixture 102 and/or a set of instructions for execution by the processor 22. The set of instructions may include steps for operating the lighting fixture 102. In some embodiments, the set of instructions may be first received from the control system 104, stored in the memory 20 of the lighting fixture 102 for execution by the processor 22. Alternatively, the control system 104 may provide configuration parameters to be used in conjunction with the set of instructions from memory 20 for execution by the processor 22. For example, the instructions and/or configuration parameters may be uploaded by the control system 104 to memory 20 in the form of a software program within each of the lighting fixtures 102 for execution by processor 22.

Furthermore, the lighting fixtures 102 may optionally include a unique identifier 26 that is physically located on the device. The physical identifier 26 may be a unique identification code, a scannable bar code, or any other suitable identifiers physically located on the lighting fixture 102.

The exemplary lighting system 100 shown in FIG. 1 is installed in a floor plan 101 where a portion of the lighting fixtures 102 within the system are optically isolated from other lighting fixtures 102 within the system. For example, a portion of the lighting fixtures 102 may be separated from other lighting fixtures by an optical bather, such as a wall 106. As can be seen in FIG. 1, the exemplary floor plan 100 includes a plurality of rooms 110, 120, 130, 140 each separated by walls 106. Each room 110, 120, 130, 140 is optically isolated and does not provide light to any other room or to hallway 150 shown in exemplary floor plan 100. For example, lighting fixtures 102 within room 110 cannot emit light to or receive light from lighting fixtures 102 from rooms 120, 130 and 140, or from any lighting fixtures (not shown) that may be installed in hallway 150. The lighting fixtures 102 within rooms 120, 130 and 140 are similarly isolated from and cannot emit light to or receive light from fixtures from the other rooms.

Those skilled in the art will understand that the exemplary embodiments described herein may be implemented in any number of manners, including as a separate software module, as a combination of hardware and software, etc. For example, the exemplary analysis methods may be embodiment in one or more programs stored in a non-transitory storage medium and containing lines of code that, when compiled, may be executed by at least one of the plurality of processor cores or a separate processor. In some embodiments, a system comprising a plurality of processor cores and a set of instructions executing on the plurality of processor cores may be provided. The set of instructions may be operable to perform the exemplary methods discussed below.

Figure 3:
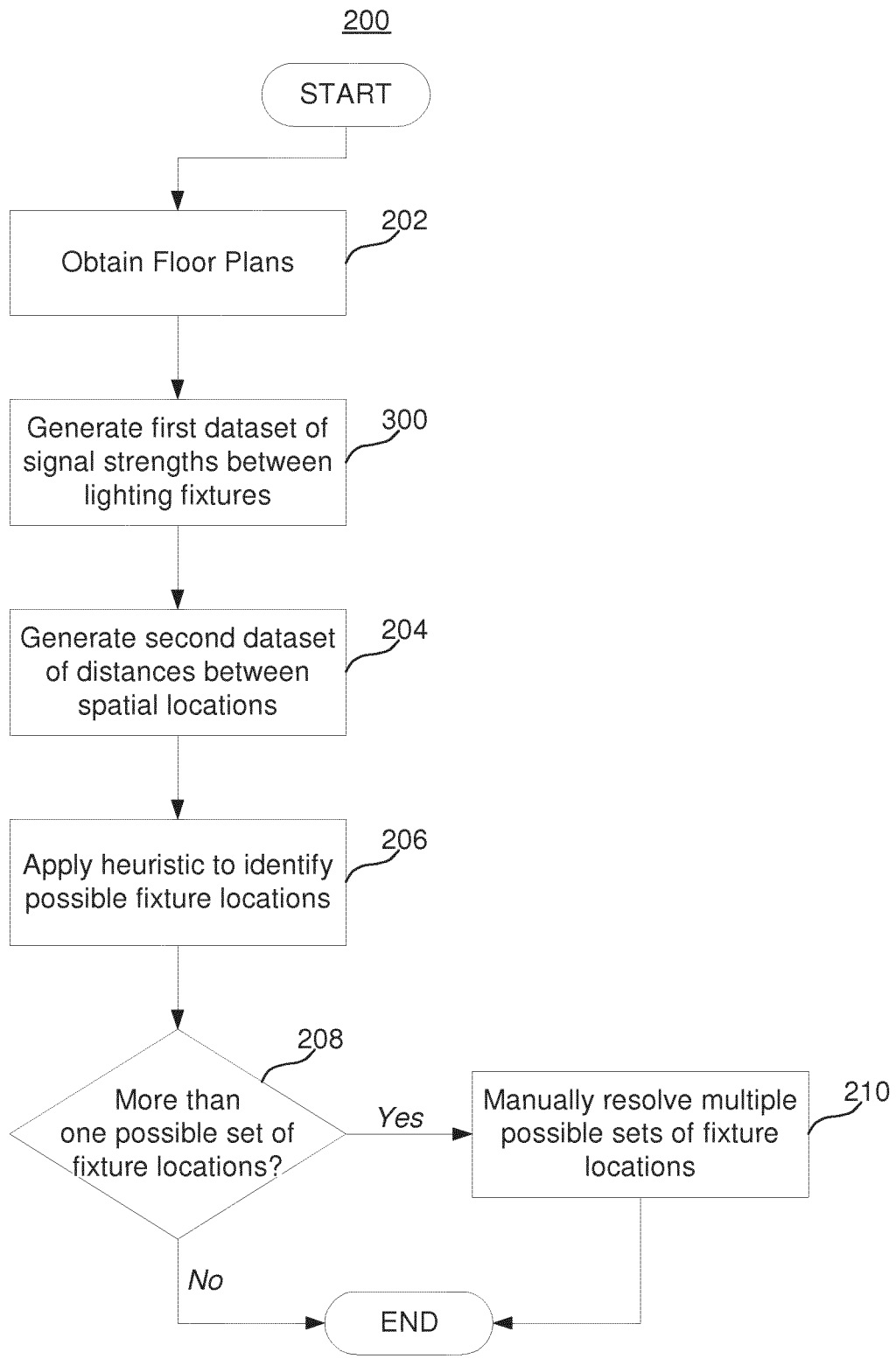
FIG. 3 shows an exemplary embodiment of a method for mapping lighting fixtures to their respective spatial locations according to the present invention.

FIG. 3 shows an exemplary method 200 for mapping lighting fixture 102 locations according to the present invention. The method 200 may be executed by a control system 104 for commissioning a set of lighting fixtures 102 within a floor plan 101. In some embodiments, the lighting fixtures 102 may be within one room. In particular, lighting fixtures 102 within the same room may be optically available to each other and may emit light to or receive light from other lighting fixtures 102 fixtures within the same room. In other embodiments, some lighting fixtures 102 may be optically isolated from other lighting fixtures 102 by a wall 106 or other optical bathers, such as, for example, a divider, a partition, tall furniture etc. For example, the lighting fixtures 102 within each of room 110, 120, 130, 140 as shown in FIG. 1 are optically separated from the lighting fixtures 102 within the other rooms.

In step 202, a building floor plan 101 is received as an input. The building floor plan 101 may be any suitable drawings of the layout of a plurality of lighting fixtures 102 for commissioning. The floor plan 101, which may also be referred to as a reflected ceiling plan, provides the spatial locations for all of the lighting fixtures 102 within a lighting system 100. However, the floor plan 101 does not provide information as to which lighting fixture 102 is located within each spatial location. Therefore, a commissioning process is necessary to map each of the lighting fixtures 102 to their respective spatial locations. The floor plan 101 may be provided in any suitable form. Typically, the floor plan 101 is an architectural drawing providing a graphical demonstration of the spatial locations within the lighting system 100. For example, the floor plan 101 may be provided as a computer-aided design (CAD) drawing or a building information modeling (BIM) drawing. The CAD or BIM drawings may be generated in a computer drawing software and subsequently exported as a floor plan 101 in any suitable machine readable format. In one embodiment, the control system 104 is configured to read the floor plan 101 from the machine readable format. Alternatively, a floor plan 101 may be manually inputted by a user, such as a lighting engineer, based on observing the physical attributes of the building layout and manually inputting the floor plan 101 into the control system 104. The user may manually input the floor plan 101 into the control system 104 via a graphical user interface.

Next, step 300 generates a first dataset of strengths of light or other signal that is suitable for measuring the distances between two lighting fixtures 102 emitted and received between lighting fixtures 102. The first dataset may be based on the strengths of light or other signal received by a sensor on a first lighting fixture 102 from every other lighting fixture 102 within the lighting system 100. It is noted that the first dataset is determined based on the strength of the light or other signal and does not require the use of a triangulation method, which requires the user to manually establish at least three reference beacon nodes corresponding to three lighting fixtures 102. The first dataset as obtained by photosensing are typically high in accuracy, but are limited in the types of scenarios where it can be generated and/or used. In some situations, the first dataset cannot be obtained or can only be obtained with reduced accuracy by using only the luminaires 10 and detecting the strength of light by the photosensors 12 of the lighting fixtures 102. Rather, an alternate form of signaling that is capable of penetrating the optical barriers, e.g., walls 106, is needed to generate the first dataset for a plurality of lighting fixtures 102.

For example, the strengths of signal between two lighting fixtures 102 may be based on emitting a RF signal from a RF signal generator 14 of a first lighting fixture and receiving and measuring the strength of the RF signal by a RF signal sensor 16 of a second lighting fixture. The RF signal sensor 16 may measure the strength of a signal and determine a relative arrangement of the first and second lighting fixtures using any suitable localization methods, including, but not limited to, Angle-Of-Arrival (AOA) methods, Time-Difference-Of-Arrival (TDOA) methods and Received Signal Strength Indicator (RSSI), Time of Flight (ToF) based methods. Although RF signaling is less accurate than photosensing and tend to be less precise due to multi-path reflections and interferences in an indoor environment, the combination of photosensing and RF signaling may be used to provide an adequate method for providing relative arrangements between a set of lighting fixtures 102 that is across multiple rooms within a floor plan 101. Therefore, this combination allows for an improved method for commissioning lighting fixtures 102 across multiple rooms at the same time. In certain embodiments, the combination of photosensing and RF signally may also provide relative arrangements and commissioning of lighting fixtures 102 across different floors within a building. Furthermore, RF signal may be used to provide relative arrangements for lighting fixtures 102 that do not include a luminaire 10 and/or a photosensor 12. Specifically, the RF signaling may be used to provide relative arrangements for one or more lighting fixtures 102 that do not include a luminaire 10 and thus, do not emit light. Such lighting fixtures 102 that do not include a luminaire 10 may include controllers, sensors (e.g., motion sensors, temperature sensors, etc.), user interfaces, RF signal emitters, etc. For lighting fixtures 102 where the relative arrangements may be obtained by either photosensing or RF signaling, one or both may be used. When both photosensing and RF signaling are used, they can be used to validate the relative arrangements generated by the other signaling method, and thereby, improve the accuracy of the relative arrangements provided.

Figure 4:
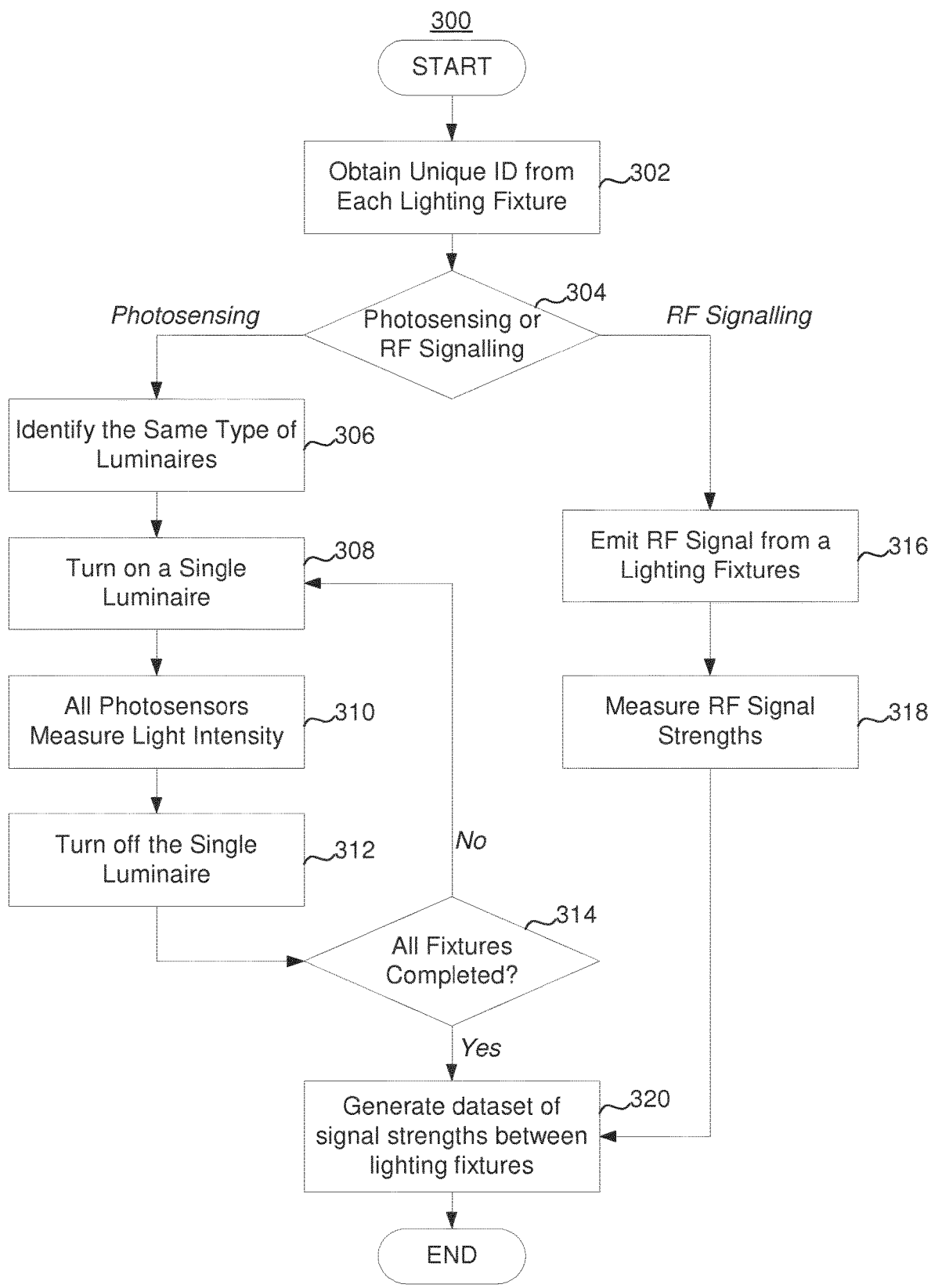
FIG. 4 shows an exemplary embodiment of a method for generating a first dataset corresponding to strengths of signals received by the first sensors of each of the plurality of lighting fixtures 102 from every other one of the plurality of lighting fixtures 102 is provided according to the present invention.

In the particular exemplary embodiment shown in FIG. 4, an exemplary method 300 for generating a first dataset corresponding to strengths of signals received by the sensor of each of a plurality of lighting fixtures 102 from every other one of the plurality of lighting fixtures is provided. The method for obtaining the first dataset as discussed below are made in reference to lighting fixtures 102 having a RF signal generator 14 and a RF signal sensor 16, which may be separate components or may be integrated within a single RF chip 18, or a luminaire 10 and a photosensor 12. In certain embodiments, the lighting fixtures 102 may include a luminaire 10 and a photosensor in combination with the RF chip 18, or RF signal generator 14 and RF signal sensor 16. However, such a combination is not required.

In step 302, the method 300 may instruct each of the lighting fixtures 102 to turn on and transmit their electronic unique identifiers. The control system 104 may receive and correlate each electronic unique identifiers with its respective lighting fixture 102. However, the electronic unique identifier provided by the lighting fixtures 102 do not provide any information as to the spatial location of the lighting fixtures 102 and requires commissioning by the control system 104 so that it can be matched to its correct spatial location within the floor plan 101.

In step 304, the method 300 determines whether the first dataset for a plurality of lighting fixtures 102 is to be determined by photosensing or by RF signaling. There are a number of different types of scenarios where the strength of signals emitted and received between lighting fixtures 102 may not be accurately measure by emitting a light from a luminaire 10 of a lighting fixture 102 and measuring the strengths of light received by photosensors 12 on the other lighting fixtures 102. In these scenarios, it may be possible to supplement the data obtained from photosensing with data obtained using RF signaling. For example, in a lighting system 100 where a portion of the lighting fixtures 102 are optically isolated from other lighting fixtures 102, e.g., the lighting fixtures 102 within each room 110, 120, 130 and 140 being optically isolated from those in the other rooms, the first dataset cannot be determined using only the luminaires 10 and detecting the strength of light by the photosensors 12 of the lighting fixtures 102. Therefore, photosensing cannot be relied upon to provide the strengths of signals emitted and received between lighting fixtures 102 that are optically isolated from each other, as light cannot penetrate the walls 106 to reach other lighting fixtures 102 within the floor plan 101. RF signaling may be used to generate data corresponding to strength of signal emitted and received between lighting fixtures 102 that are optically isolated from one another, as RF signaling can penetrate walls, ceiling and/or floors to overcome the deficiencies of photosensing. Therefore, the combination of photosensing and RF signaling may be used to improve accuracy of commissioning and/or to commission lighting fixtures 102 for an entire floor across multiple rooms, or even for across multiple floors.

In the exemplary floor plan 101 shown in FIG. 1, the first dataset for all of the lighting fixtures 102 within floor plan 101 may be obtained using either photosensing or RF signaling. The strengths of signals emitted and received between lighting fixtures 102 within each of rooms 110, 120, 130 and 140 may be determined by emitting light from the luminaires 10 and detecting the light within each of the rooms 110, 120, 130 and 140. However, the strengths of signals emitted and received between lighting fixtures 102 across rooms, e.g., from a first lighting fixtures in room 110 to a second lighting fixture in room 120, may be obtained by RF signaling.

As another example, when the ceiling of a room or layout is not flat, photosensing may also be less accurate. In particular, the irregularities of a non-flat ceiling may cause internal reflection between the ceiling and other surfaces within the floor plan 101. Therefore, a secondary method for providing the relative arrangements of lighting fixtures 102, such as, for example, RF signaling, can be used for some of the lighting fixtures 102 and may also be used in addition to photosensing to improve accuracy.

In certain embodiments, the lighting system 100 may include lighting fixtures 102 having multiple different types of luminaires 10. For example, the luminaires 10 may have different lumen output and/or different light distribution patterns, which would distort the first dataset obtained by photosensing. Therefore, a secondary method for generating the first dataset for a plurality of lighting fixtures 102, such as, for example, RF signaling, can be used for some of the lighting fixtures 102 and may also be used in addition to photosensing to improve accuracy.

If photosensing is to be used, the method 300 proceeds to step 306. In step 306, the method 300 determines the type of luminaires 10 that are present within a pair of lighting fixtures 102 for which a strength of signal emitted and received between the two is to be determined. It is noted that methods 200 and 300 may be more accurate when they are applied across lighting fixtures 102 having the same type of luminaires 10. Different types of luminaires 10 may provide different lumen output and/or different intensity distribution. Therefore, the intensity of the light received from one type of luminaire 10 may not be directly comparable to the intensity of the light received from a different type of luminaire 10. Thus, data corresponding to the intensity of light received from mixed types of luminaires 10 cannot be correlated to each other. Rather, lighting fixtures 102 having each type of luminaire 10 may be grouped together, and each group may be separately evaluated to determine the first dataset for each group of lighting fixtures 102. Alternatively, the first dataset for lighting fixtures 102 having different types of luminaires 10 may be determined by RF signaling.

In another alternative embodiment, the first dataset may be obtained by normalizing the photosensor readings to reduce the negative effect of comparing different strengths of signals generated by different types of luminaires 10. The normalized readings provide improved accuracy for determining the relative arrangements of lighting fixtures 102 corresponding to a first dataset obtained from a plurality of lighting fixtures 102 having different types of luminaires 10. In one exemplary embodiment, a room may include lighting fixtures 102 having two types of luminaires: Type A and Type B. The Type A luminaire may be able to generate a lumen output of 1000 lx, whereas the Type B luminaire may be able to generate a lumen output of 2000 lx. To normalize the photosensing data obtained using both of these types of luminaries, the photosensor reading values obtained from light generated from a Type B luminaire may be divided by two to render such values comparable to photosensing readings obtained from light generated from a Type A luminaire.

There are a number of different ways to determine whether the luminaires 10 of two different lighting fixtures 102 are the same or different. For example, step 306 may use the floor plan 101, or reflected ceiling plan, to determine whether each room or layout includes lighting fixtures 102 having only a single type of luminaires 10 or multiple types of luminaires 10. If the floor plan 101 indicates that the lighting system 100 includes lighting fixtures 102 having only a single type of luminaires 10, then all of the light emitting lighting fixtures 102, i.e., those lighting fixtures 102 having the single type of luminaires 10, may be used all together to provide estimated distances by photosensing.

As another example, step 306 may determine whether the lighting system 100 includes lighting fixtures 102 having multiples types of luminaires 10 by retrieving identifying information from each of the lighting fixtures 102. The identifying information may include the type or model number for each of the lighting fixtures 102. Lighting fixtures 102 having each type and/or model number may be grouped together, and each group may be separately evaluated to determine the first dataset for each group of lighting fixtures 102.

In an alternative embodiment, step 306 may determine whether the lighting system 100 includes lighting fixtures 102 having multiples types of luminaires 10 based on the photosensor 12 readings detected. Lighting fixtures 102 having different types of luminaires 10 may be identified based on their lumen output. When different types of luminaires 10 provide significantly different lumen outputs, the data recorded by the photosensors 12 may also be drastically different. One approach for separating these different types of lighting fixtures 102 having luminaires 10 that provide significantly different lumen outputs, is to turn each lighting fixture 102 on only one at a time, record the intensity of the light received by photosensors 12 located within other lighting fixtures 102, and subsequently compare the recorded data for each lighting fixture 102 with those recorded for other lighting fixtures 102. Lighting fixtures 102 having significantly different lumen outputs may be grouped based the intensity of the light detected by the photosensors 12. For example, data generated by lighting fixtures 102 having high intensity lumen outputs may be grouped together whereas data generated by lighting fixtures 102 having low intensity lumen outputs may be separately grouped together. A clustering method or algorithm may be applied to identify groupings of lighting fixtures 102 based on the intensity of light detected by the photosensors 102.

In another embodiment, step 306 may determine whether the lighting system 100 includes lighting fixtures 102 having multiples types of luminaires 10 based on the power levels drawn by each lighting fixtures 102. Lighting fixtures 102 having different types of luminaires 10 may be identified based on their power draw. Typically, each type of luminaire 10 draws a different level of power when in operation. The power draw for each lighting fixtures 102 may be recorded by a separate device (not shown) within the lighting system 100, such as, for example, a power meter. Lighting fixtures 102 having different types of luminaires 10 may be grouped based their power draw levels.

In steps 308 to 312, the first dataset for a plurality of lighting fixtures 102 having the same type of luminaires 10 may be determined by photosensing in a sequential manner preferably, lighting fixtures 102 having luminaires 10 of the same type are activated in a sequential manner and turned onto the same output level in step 308 to reduce fluctuations, and thus, errors in readings detected by the photosensors 12. In step 308, a single lighting fixture 102 may be activated to emit a visible light from its luminaire 10. In step 310, the photosensors 12 located within the other lighting fixtures 102 detect and measure the intensity of the light emitted from the single lighting fixture. All other luminaires 10 from other lighting fixtures 102 are generally turned off in steps 308 and 310 to allow the photosensors 12 located within the other lighting fixtures 102 to measure the intensity of the light emitted from the single lighting fixture without significant interference. In step 312, the single lighting fixture 102 is subsequently turned off after data has been collected by the photosensors 12 located within the other lighting fixtures 102.

It is also preferable to conduct steps 308 to 312 during nighttime to reduce interference from daylight to the photosensor 102 readings. However, if steps 308 to 312 are conducted during daytime or with light interference from other nearby light sources that may interfere with readings detected by the photosensors 12, a baseline level of ambient light may be determined before step 308. The readings detected by the photosensors 12 may be evaluated in comparison to this baseline level. For example, the baseline level may be subtracted from the measurements obtained by the photosensors 12.

In step 314, the method 300 provides the first dataset for all lighting fixtures 102 having the same type of luminaires 10 which have been evaluated via steps 308 to 312. If not, the method 300 returns to step 308 sequentially for each subsequent lighting fixture until all lighting fixtures 102 having the same type of luminaires 10 have been evaluated via steps 308 to 312. If there are other lighting fixtures 102 that have a different type of luminaire 10 that have not yet been evaluated via steps 308 to 312, the method returns to step 308 and continues with steps 310 to 314 with a different group of lighting fixtures 102 that have a different type of luminaires 10 to determine the estimated distances between lighting fixtures 102 within this subsequent group of lighting fixtures 102. The method 300 continues to return to step 308 for each group of lighting fixtures 102 having a different type of luminaires 10.

In steps 316 to 318, the first dataset for a plurality of lighting fixtures 102 may be determined by RF signaling. In step 316, each of the lighting fixtures 102 that are to be evaluated by RF signaling may emit a RF signal from its RF signal generator 14 or RF chip 18. In step 318, the RF signal from each lighting fixture 102 may be detected and received by an RF signal sensor 16 or RF chip 18 located within every other lighting fixture 102 that is to be evaluated by RF signaling. The data obtained by the RF signal sensor 16 or RF chip 18 may correspond to strengths of the RF signals received, or may correspond to distances measured by the RF signal sensors 16 or RF chips 18. In one exemplary embodiment, for lighting fixtures 102 each comprising an RF chip 18 therein, a strength of the RF signal between each pair of lighting fixtures 102 may be measured. For example, a first lighting fixture may transmit an RF signal to every other lighting fixture 102, which allows the RF signals sensors 16 or RF chips 18 located within every other lighting fixture 102 to measure the strength of the RF signal from the first lighting fixture. These measurements using RF signals may be repeated for each and every one of the lighting fixtures 102 that are to be evaluated by RF signaling. To improve accuracy of the first dataset obtained by RF signaling, steps 316 and 318 may be repeated to obtain multiple measurements of estimated distances between lighting fixtures 102 that are to be evaluated by RF signaling.

In certain limited circumstances, the RF signal between two lighting fixtures 102 may not be capable of being directly measured. In these situations, one or more additional receivers or transmitters may be added to the lighting system 100 to assist in generating the first dataset for a plurality of lighting fixtures 102. These additional receivers or transmitters may emit RF signal and/or detect RF signal in a similar manner as described above with respect to the RF signal generator 14, RF signal sensor 16 and/or RF chip 18.

In step 320, data corresponding to strengths of either type of measuring signal, e.g., light or RF signal, may be used to generate a first dataset for the plurality of lighting fixtures 102 within the lighting system 100 that may be represented in the form of an adjacency matrix. In one embodiment, the intensity of light emitted from each lighting fixture 102 via step 310 may be incorporated in the adjacency matrix. In another embodiment, the strengths of RF signals detected from each lighting fixture 102 via step 318 may be incorporated in the adjacency matrix. Typically, the adjacency matrix includes only data obtained from photosensors 12, or only data obtained from RF chip 18 or RF signal sensor 16.

For a lighting system 100 having M number of lighting fixtures 102 within a floor plan 101 that is targeted for commissioning, the adjacency matrix may be an M×M matrix corresponding to a set of readings obtained only by photosensors 12, or a set of readings RF signal sensors 16. The adjacency matrix include a plurality of elements each represented with an index of (i, j), wherein i and j each correspond to a set of identifier for each of the plurality of lighting fixtures 102. For example, i and j may each independently be an integer from 1 to M, wherein each integer is an index corresponding to a lighting fixture 102. More specifically, the element (i, j) within the adjacency matrix correspond to readings obtained by the sensor of the lighting fixture identified with the value j based on a measuring signal (e.g., light or RF signal) emitted from the lighting fixture identified with the value i.

As discussed above, the RF signal sensor 16 or RF chip 18 may generate data corresponding to strengths of the RF signals received. The distances measured by the RF signal sensors 16 or RF chips 18 are inversely related to the strengths of the RF signals received. For example, the distance measurements may be modified based on a predetermined maximum distance threshold. Specifically, differences between the distances measured and the predetermined threshold may be obtained to correspond to strengths of the RF signals received. The data may be further modified to allow for an asymptotic convergence of the distance measurements with the expected signal strengths. In particular, if the measured distances are greater than the predetermined maximum distance threshold, the signal strength may be assumed to be zero (i.e., no signal). For example, the predetermined maximum distance threshold may be set to ten meters. A distance that is measured by the RF signal sensor 16 or RF chip 18 between two lighting fixtures 102 may be reassigned to the predetermined maximum distance threshold, in this example, ten meters. Additionally, the signal strength between two RF devices having a measured distance greater than the predetermined threshold may be reassigned to be zero. The converted data corresponding to the strengths of the RF signals received may be incorporated in the adjacency matrix.

The intensity of light may be affected by the distance from the light source, but may also be affected by the reflectivity of the indoor environment in which the lights are installed. For example, in some environments, various objects within a room (e.g., walls, windows, carpets, furniture, etc.) may have different levels of reflectivity that may interference with and/or influence the the intensity of light received by the photosensors 12.

The adjacency matrix may be used to generate an initial graph of the lighting fixtures 102, where each lighting fixture 102 is represented as a node and the data from the adjacency matrix is represented as the edge weight connecting two nodes within the initial graph. A minimum threshold value may be used in generating the initial graph. For example, if the data within element (i,j) of the adjacency matrix is less than the minimum threshold value, the data within element (i,j) of the adjacency matrix may be re-assigned to zero, which signifies that the two nodes are disconnected or isolated from, e.g., optically isolated, from each other. Depending on the minimum threshold value selected the initial graph may be populated (i.e., when the threshold is set at a low value the graph may be dense), or may be very sparse (i.e., when the threshold is set at a high value) and there are fewer edges between lighting fixtures 102. The modified adjacency matrix, which is updated according to the minimum threshold value, may be used to generate the initial graph of the lighting fixtures 102. A direct edge from a node corresponding to the index value i to a node corresponding to the index value j provides graphical demonstration for relative arrangements of the nodes based on measurements obtained by either photosensor 12 or RF signal sensor 16 of a lighting fixture indexed with the value j (that is greater than the minimum threshold value) when a luminaire 10 or RF signal generator 14 from the lighting fixture indexed with the value i generates a signal. Furthermore, the floor plan 101 may be used in conjunction with the adjacency matrix to provide a more accurate initial mapping of the plurality of lighting fixtures 102 within the lighting system 100. Such an initial graph may be obtained using any suitable methods, including, for example, graph drawing methods, e.g., spectral graph drawing algorithm or force-direct algorithms. The spectral graph drawings algorithm may use the first two eigenvectors of a matrix, such as the Laplace matrix of the initial graph, as Cartesian coordinates of the graph's vertices. The first two eigenvectors may correspond to the two largest eigenvalues. The force-directed graph drawing algorithms may be used to position the nodes of the initial graph in a two-dimensional space so that all the edges are of more or less equal length and there are as few crossing edges as possible. This is done by assigning forces among the set of edges and the set of nodes, based on their relative positions, and then using these forces to simulate the motion of the edges and nodes. Typically, drawings methods utilizing models for spring-like attractive forces based on Hooke's law may be used to attract pairs of endpoints of the graph's edges towards each other.

Next, method 200 proceeds to step 204, which obtains a second dataset of distances between the spatial locations shown in floor plan 101. The second dataset may be generated by the control system 104 or may be obtained by the control system 104 from another source. In some exemplary embodiments, the control system 104 may obtain the second dataset as an input from another computerized source or may obtain the second dataset as a manual input from a user. Furthermore, the second dataset may be obtained before or after the first dataset. The distances of the second dataset typically correspond to the actual dimensions between light fixtures 102 within the floor plan 101, or are measured physical distances within a layout of a floor or building. Although each of the spatial locations is indicated within floor plan 101, the floor plan 101 does not provide information as to which lighting fixture 102 is located within each spatial location.

In step 206, a heuristic analysis is used to identify possible mappings of lighting fixtures 102 to their spatial locations. Any suitable heuristic analysis may be utilized, including but not limited to, an ant system method, a tabu search method, a scatter search methods, a simulated anneal methods, or combinations thereof. The inputs to the heuristic analysis may include a first dataset corresponding to strengths of signals received by the sensor of each of a plurality of lighting fixtures 102 from other one of the plurality of lighting fixtures, such as the dataset obtained from step 300, and a second dataset corresponding to distances between one spatial location to every other one of the spatial locations, such as the dataset obtained from step 204. The heuristic analysis may evaluate the input data and generate an output that identifies one or more possible mappings of the plurality of light fixtures 102 to the plurality of spatial locations. Specifically, the heuristic analysis may generate one or more possible mappings for each of the light fixtures 102 to their respective spatial locations within the floor plan 101. Each mapping may be a sequence specifying the spatial location of each lighting fixtures 102 within the floor plan 101 or building layout.

In one particular embodiment, the heuristic analysis utilizes an objective function. For example, the objection function may be expressed as:

$$\mathrm{Min} f(p) = \Sigma D_{p(i),p(j)} A_{i,j}$$

wherein i and j are each as defined above. The decision variable p is a function corresponding to a permutation of identifiers for each of the plurality of spatial locations within the floor plan 101. The variable A may correspond to a first dataset, such as the dataset obtained from step 300. The variable D may correspond to a second dataset corresponding to distances between one spatial location to every other one of the spatial locations, such as the dataset obtained from step 204. Each of D and A may be a matrix. Specifically, the element (p(i), p(j)) within matrix D may correspond to distances a first spatial location identified with the value p(i) and a second spatial location identified with the value p(j). Similarly, the element (i, j) within matrix A may correspond to a strength of a signal detected by a first lighting fixture 102 identified with the value j based on a measuring signal (e.g., light or RF signal) emitted from a second lighting fixture 102 identified with the value i. For example, for a lighting system 100 having M number of lighting fixtures 102 and M number of spatial locations corresponding thereto, the integers 0, 1, . . . M−1, M provide an index sequence of identifiers for the lighting fixtures 102 for matrix A, whereas p(0), p(1), . . . p(M−1), p(M), provides an index sequence of identifiers for the spatial locations for matrix D. The heuristic analysis aims to identify a permutation of identifiers for p, which correlates each lighting fixture 102, as identified by i or j, to its respective spatial location, as identified by p(i) or p(j).

As shown in step 208, if the heuristic analysis identifies only a single permutation for mapping the lighting fixtures 102 to the spatial locations, e.g., a single permutation for p, then all of the lighting fixtures 102 within the lighting system 100 are properly mapped to their respective spatial locations. In certain situations, the heuristic analysis may identify more than one possible mapping of the lighting fixtures 102 to the spatial locations. For example, in floor plans 101 having lighting fixtures 102 that are arranged in a symmetrical manner, such as that shown in FIG. 1, the heuristic analysis may identify multiple possible mappings of the lighting fixtures 102 to the spatial locations. For a room having a square shape, the heuristic analysis may generate four possible mapping of the lighting fixtures 102 to the spatial locations.

In step 210, the multiple possible mapping of lighting fixtures 102 may be resolved by obtaining manual input from a user. For example, one of the lighting fixtures 102 within the lighting system 100 may be activated, for example, turned on to emit a light. The user may observe the physical location of the activated lighting fixture 102 within the room or building and manually input the spatial location of the activated lighting fixtures 102 within the floor plan 101. This manual input may be received by a control system 104 via a graphical user interface.

Alternatively, step 210 may manually resolve multiple possible sets of fixture locations by turning on a lighting fixture 102 based on each one of the possible mappings of the lighting fixtures 102 to the spatial locations. For example, a lighting fixture 102 may be activated, for example, turned on to emit a light. The user may observe the physical location of the activated lighting fixture 102 within the room or building and manually input a boolean value indicating whether or not the activated lighting fixture 102 corresponds to the spatial location in floor plan 101 matched by a first possible mapping generated by the heuristic analysis. If the activated lighting fixture does not correspond to the spatial location indicated by the first possible mapping, this process may be iteratively performed with each of the possible mappings generated by the heuristic analysis of step 206 until a match is found. For example, in a room having a square shape, the heuristic analysis may generate four possible mapping of the lighting fixtures 102 to the spatial locations. A light fixture 102 may be turned on to emit a light to determine if the activated lighting fixture corresponds to the spatial location indicated by a first of four possible mappings. If not, a subsequent possible mapping, which may be a rotated arrangement of the first possible mapping may be tested until a match is found.

EXAMPLES

The following examples describe specific aspects of the invention to illustrate the invention but should not be construed as limiting the invention, as the examples merely provide specific methodology useful in the understanding and practice of the invention and its various aspects.

Example I

Figure 5A:
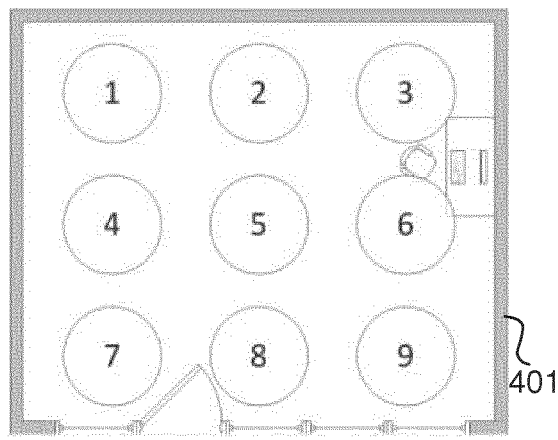
FIG. 5a shows an example of a floor plan having a plurality of light fixtures.
Figure 5B:
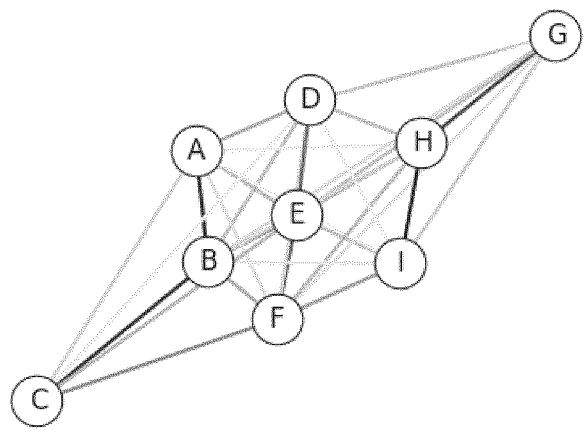
Figure 5C:
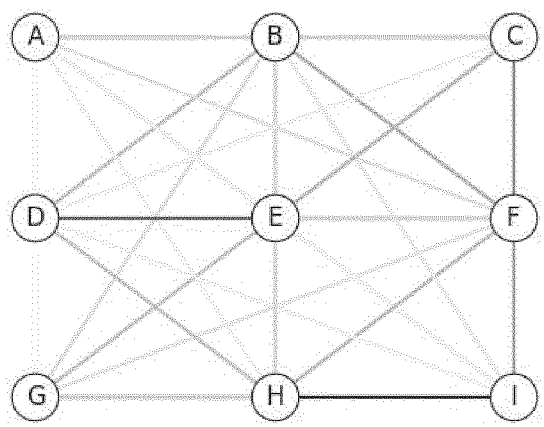
Figure 7A:
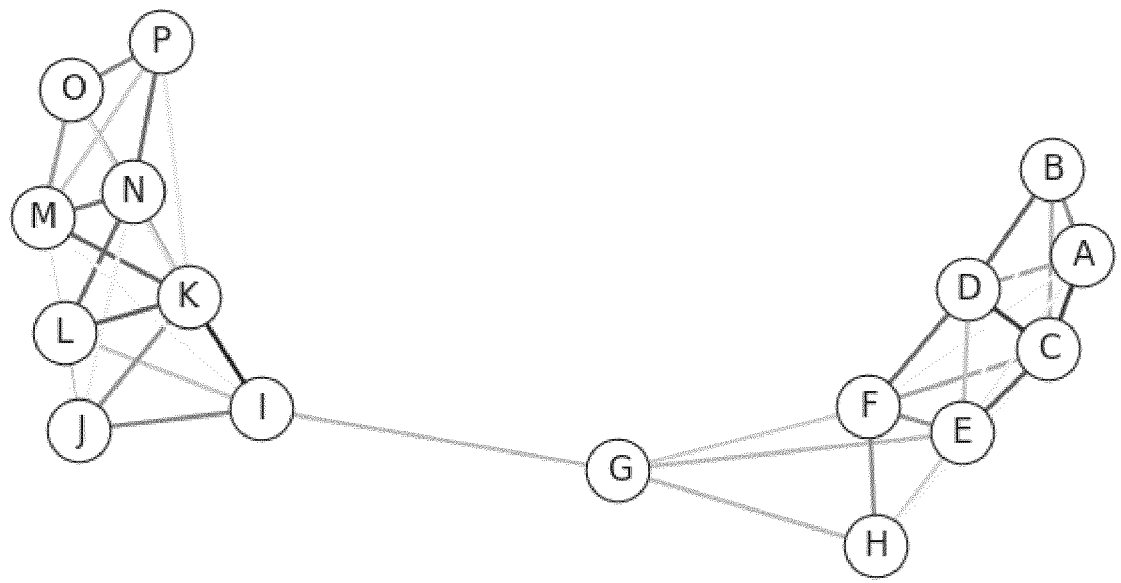
FIG. 7a shows another example of an initial graph of a plurality of light fixtures.
Figure 7B:
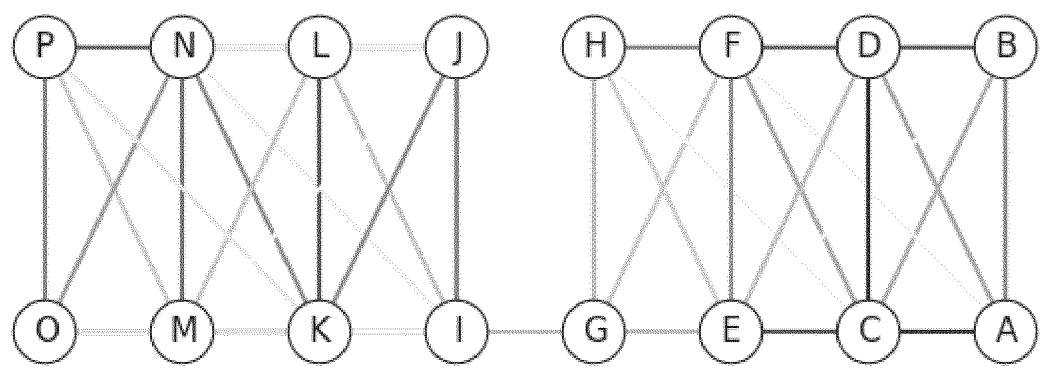
FIG. 7b shows a mapping according to the present invention for the light fixtures shown in FIG. 7b.

In Example I, lighting fixtures in a multiple room layout having a floor plan 401 as shown in FIG. 5a may be commission by a control system using the methods 200 and 300 described above. In this example, the floor plan 401 may include a total of 9 (3×3) lighting fixtures that may be mapped to their respective spatial locations. Each of the spatial locations in floor plan 401 are assigned a unique identifier number from 1 to 9. The lighting fixtures in Example I were installed in an open plan office without any walls or other bathers that may isolate a portion of the lighting fixtures from others within the lighting system. The intensity of light from a lighting fixture and may be measured by photosensors located within every other lighting fixture. The methods 200 and 300 described above may be used to map each of the lighting fixtures to their respective spatial locations within floor plan 401. Each of the lighting fixtures may also be assigned a unique identifier and in this example, the lighting fixtures are assigned letters A through I. FIG. 7b provides an initial graph that may be generated according to step 320 described above of the 9 lighting fixtures. Each lighting fixture is represented by as a node (shown as a circle) and each line connecting two nodes represents a relative arrangement between two lighting fixtures as determined using light intensity. The lighting fixtures may be assigned unique identifiers and in this example, the lighting fixtures are assigned letters from A to P, in no particular order. The initial graph may subsequently be matched to the actual dimensions and layout as provided by floor plan 401 to generate a mapping of the lighting fixtures to their spatial locations, as shown in the graph of FIG. 5c. As can be seen in FIGS. 5a and 5c, the 9 lighting fixtures are matched to their respective spatial locations as follows:

| Lighting Fixture | Spatial Location |
|---|---|
| A | 1 |
| B | 2 |
| C | 3 |
| D | 4 |
| E | 5 |
| F | 6 |
| G | 7 |
| H | 8 |
| I | 9 |

Example II

Figure 6A:
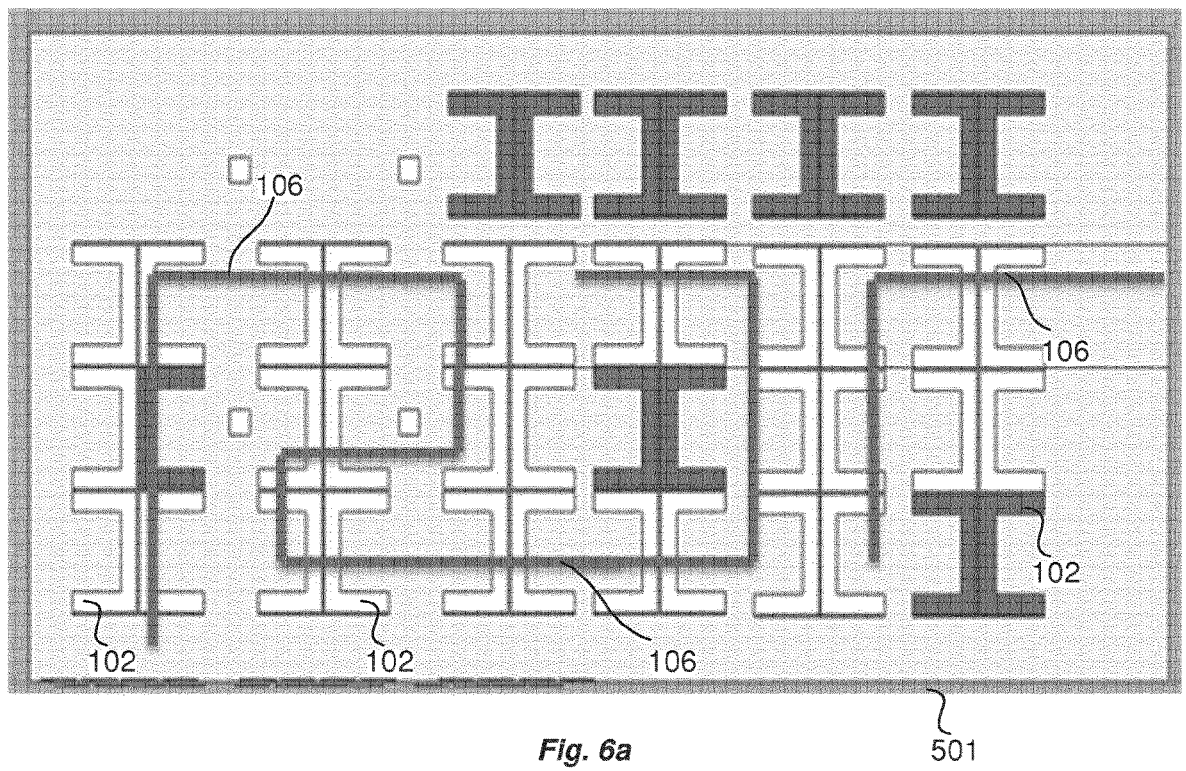
FIG. 6a shows another example of a floor plan having a plurality of light fixtures and walls optically isolating some light fixtures from others.
Figure 6B:
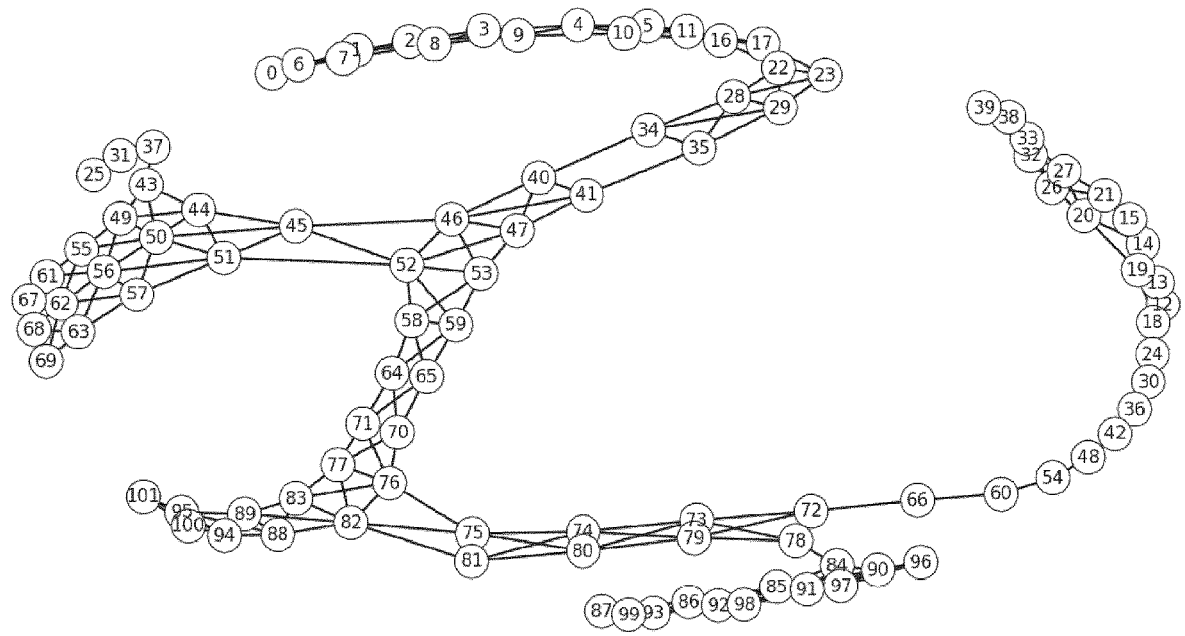
Figure 6C:
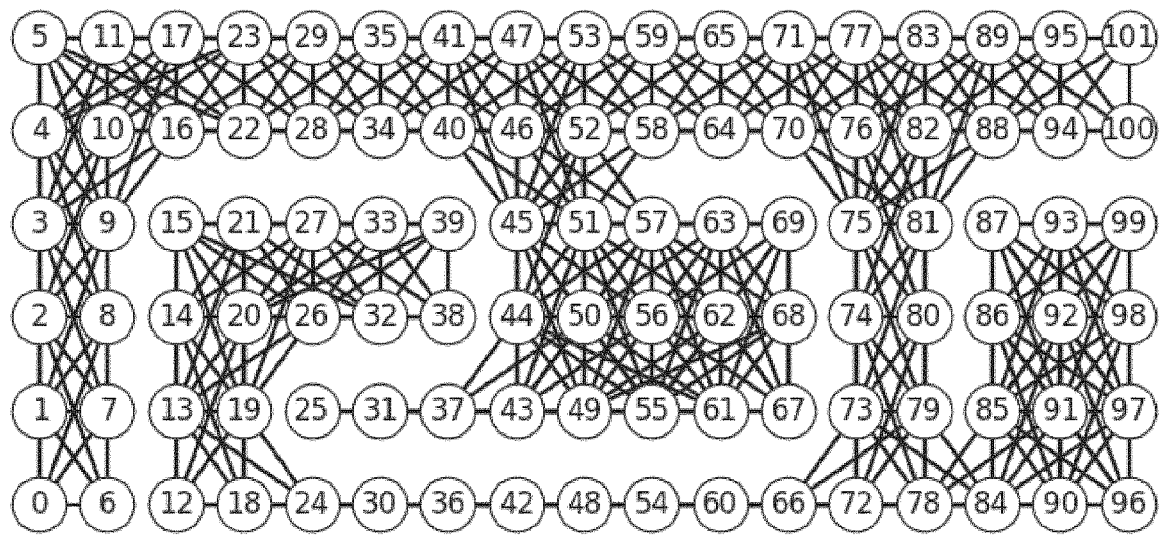

In Example II, lighting fixtures 102 in a multiple room layout having a floor plan 401 as shown in FIG. 6a may be commission by a control system using the methods 200 and 300 described above. In this example, the floor plan 501 may include a total of 102 (6×17) lighting fixtures that may be mapped to their respective spatial locations. The floor plan 501 of FIG. 6a may include a number of walls 106 that optically isolate a portion of the lighting fixtures from others. The intensity of light from a lighting fixture and may be measured by photosensors located within every other lighting fixture. The methods 200 and 300 described above may be used to map each of the lighting fixtures to their respective spatial locations within floor plan 501. First, as shown in FIG. 6b an initial graph may be generated according to step 320 described above, each lighting fixture is represented by as a node and each line connecting two nodes represents a relative arrangement between two lighting fixtures as determined using light intensity. The lighting fixtures may be assigned unique identifiers and in this example, the lighting fixtures are numbered from 0 to 101. For the purpose of this example, the lighting fixtures are sequentially number in accordance with their installation positions. The initial graph of FIG. 6b may subsequently be matched to the actual dimensions and layout as provided by floor plan 501 to generate a mapping of the lighting fixtures to their spatial locations, as shown in the graph of FIG. 6c. As can be seen in FIG. 6c, the sequence of lighting fixtures are in order, indicating that the lighting fixtures have been correctly commissioned to their respective spatial locations.

Example III

Example III provides another example of mapping of a plurality of lighting fixtures to their spatial locations. In Example III, a total of 16 (2×8) lighting fixtures are mapped to their respective spatial locations. The lighting fixtures in Example III were also installed in an open plan office without any walls or other bathers that may isolate a portion of the lighting fixtures from others within the lighting system. The methods 200 and 300 described above may be used to map each of the lighting fixtures to their respective spatial locations within floor plan 501. As shown in FIG. 7a, an initial graph may be generated according to step 320 described above, where each lighting fixture is represented by as a node and each line connecting two nodes represents a relative arrangement between two lighting fixtures as determined using light intensity. The lighting fixtures may be assigned unique identifiers and in this example, the lighting fixtures are assigned letters from A to P, in no particular order. The methods of 200 and 300 may be used to map the lighting fixtures to their spatial locations. The initial graph of FIG. 7a may subsequently be matched to the actual dimensions and layout as provided by floor plan 501 to generate a mapping of the lighting fixtures to their spatial locations, as shown in the graph of FIG. 7b.

The invention described and claimed herein is not to be limited in scope by the specific embodiments herein disclosed since these embodiments are intended as illustrations of several aspects of this invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

What is claimed is:

1. A method for mapping a plurality of lighting fixtures to a plurality of spatial locations, each lighting fixture having a sensor, the method comprising:
    obtaining a first dataset corresponding to strengths of signals received by the sensor of each of the plurality of lighting fixtures from every other one of the plurality of lighting fixtures, wherein the first dataset includes at least light intensity data, and a second dataset corresponding to distances between each of the plurality of spatial locations to every other one of the plurality of spatial locations,
    applying a heuristic evaluation using the first and second datasets to identify one or more possible mappings of the plurality of lighting fixtures to the plurality of spatial locations in a floor plan; and
    wherein each mapping being a sequence specifying the spatial location of each lighting fixture within the floor plan.

2. The method of claim 1, wherein when the heuristic evaluation identifies more than one possible mappings, the method further comprises the steps of:
    activating one of the plurality of lighting fixtures;
    receiving manual input data for a corresponding spatial location to the activated lighting fixture; and
    identifying a single mapping of the plurality of lighting fixtures to the plurality of spatial locations from the possible mappings based on the manual input data.

3. The method of claim 1, wherein at least a portion of the plurality of lighting fixtures each further comprises a luminaire, wherein each sensor of the portion of the plurality of lighting fixtures is a photosensor.

4. The method of claim 1, wherein at least a portion of the plurality of lighting fixtures each further comprises a radio frequency (RF) signal generator, wherein each sensor of the portion of the plurality of lighting fixtures is a RF signal sensor.

5. The method of claim 4, wherein a portion of the plurality of spatial locations are optically isolated from the remaining spatial locations.

6. The method of claim 1, wherein the distances between each of the plurality of spatial locations is based on the floor plan including the plurality of spatial locations.

7. The method of claim 1, wherein the heuristic evaluation utilizes the function:

$$\mathrm{Min} f(p) = \Sigma D_{p(i),p(j)} A_{i,j}$$

wherein:
    i and j each correspond to a set of identifiers for each of the plurality of spatial locations,
    p corresponds to a permutation of identifiers for each of the plurality of lighting fixtures,
    D corresponds to the second dataset, and
    A corresponds to the first dataset.

8. The method of claim 1, wherein the heuristic evaluation utilizes an ant system method, a tabu search method, a scatter search method, a simulated anneal method, or combinations thereof.

9. A lighting system, comprising:
    a plurality of lighting fixtures, each lighting fixture comprising a luminaire and a sensor, wherein the sensor is a photosensor; and
    a control system configured to independently activate and deactivate each one of the luminaire and to receive data from each sensor corresponding to an amount of light detected by each of the plurality of sensors,
    wherein the control system is further configured to obtain a first dataset corresponding to strengths of signals received by the sensors of each of the plurality of lighting fixtures from every other one of the plurality of lighting fixtures, wherein the first dataset includes at least light intensity data, and a second dataset corresponding to distances between each of the plurality of spatial locations to every other one of the plurality of spatial locations, and apply a heuristic evaluation using the first and second datasets to identify one or more possible mappings of the plurality of lighting fixtures to the plurality of spatial locations; and,
    wherein each mapping being a sequence specifying the spatial location of each lighting fixture within the floor plan.

10. The lighting system of claim 9, wherein the control system is further configured so that when the heuristic evaluation identifies more than one possible mappings, the control system activates one of the plurality of lighting fixtures, receives manual input data for a corresponding spatial location to the activated lighting fixtures; and identifies a single mapping of the plurality of lighting fixtures to the plurality of spatial locations from the possible mappings based on the manual input data.

11. The lighting system of claim 9, wherein the control system is configured to obtain the distances between each of the plurality of spatial locations based on a floor plan including the plurality of spatial locations.

12. The lighting system of claim 9, wherein the plurality of lighting fixtures further included a radio frequency (RF) signal generator; and the control system further configured to independently activate and deactivate each one of the RF signal generator and to receive data from each sensor corresponding to a strength of RF signal detected by each of the plurality of sensors.

13. A non-transitory computer readable medium containing a set of instructions executable by a processor, the set of instructions comprising:

obtaining a first dataset corresponding to strengths of signals received by the sensor of each of the plurality of lighting fixtures from every other one of the plurality of lighting fixtures, and a second dataset corresponding to distances between each of the plurality of spatial locations to every other one of the plurality of spatial locations, and applying a heuristic evaluation using the first and second datasets to identify one or more possible mappings of the plurality of lighting fixtures to the plurality of spatial locations in a floor plan;

wherein each mapping being a sequence specifying the spatial location of each lighting fixture within the floor plan.

14. The method of claim 1, wherein the first dataset is obtained by sequentially directing each of the plurality of lighting fixtures to emit a measuring signal and receiving data corresponding to a strength of the measuring signal measured by the sensor from every other one of the plurality of lighting fixtures.

15. The lighting system of claim 9, wherein the control system is further configured to obtain the first data set by sequentially directing each of the plurality of lighting fixtures to emit a measuring signal and receiving data corresponding to a strength of the measuring signal measured by the sensor of every other one of the plurality of lighting fixtures.

16. A method for mapping a plurality of lighting fixtures to a plurality of spatial locations each indicated within a floor plan, each lighting fixture comprising a photosensor, the method comprising:

generating a first data set by sequentially directing each of the plurality of lighting fixtures to turn on, one at a time, and receiving data corresponding to a strength of light measured by the photosensor from every other one of the plurality of lighting fixtures, wherein the first dataset corresponds to strengths of light received by the photosensor of each of the plurality of lighting fixtures from every other one of the plurality of lighting fixtures, and obtaining a second dataset, based on a floor plan including a plurality of rooms each separated by walls which optically isolate said rooms, corresponding to distances between each of the plurality of spatial locations within the floor plan to every other one of the plurality of spatial locations within the floor plan, and applying a heuristic evaluation using the first and second datasets to identify one or more possible mappings of the plurality of lighting fixtures to the plurality of spatial locations within the floorplan.

17. A lighting system, comprising:

a plurality of lighting fixtures, each lighting fixture comprising a luminaire and a photosensor; and a control system configured to independently activate and deactivate each one of the luminaire and to receive data from each photosensor corresponding to an amount of light detected by each of the plurality of photosensors, wherein the control system is further configure to obtain a first dataset corresponding to strengths of light received by the sensors of each of the plurality of lighting fixtures from every other one of the plurality of lighting fixtures by sequentially directing each of the plurality of lighting fixtures to turn on, one at a time, and receiving data corresponding to a strength of the measuring signal measured by the photosensor from every other one of the plurality of lighting fixtures, and a second dataset, based on a floor plan including a plurality of rooms each separated by walls which optically isolate said rooms, corresponding to distances between each of the plurality of spatial locations within the floor plan to every other one of the plurality of spatial locations within the floor plan, and apply a heuristic evaluation using the first and second datasets to identify one or more possible mappings of the plurality of lighting fixtures to the plurality of spatial locations within the floor plan.

* * * * *